United States Patent [19]

Voll

[11] Patent Number: 4,958,946
[45] Date of Patent: Sep. 25, 1990

[54] SEPARATION FOR BALL BEARINGS
[75] Inventor: Horst Voll, Hassfurt, Fed. Rep. of Germany
[73] Assignee: FAG Kugelfischer Georg Schafer (KGaA), Fed. Rep. of Germany
[21] Appl. No.: 466,471
[22] Filed: Jan. 17, 1990
[30] Foreign Application Priority Data
 Jan. 18, 1989 [DE] Fed. Rep. of Germany ....... 3901250
[51] Int. Cl.$^5$ .............................................. F16C 33/42
[52] U.S. Cl. ..................................... 384/523; 384/530
[58] Field of Search ............... 384/523, 530, 534, 526, 384/527, 528 .

[56] References Cited
U.S. PATENT DOCUMENTS
3,443,847  5/1969  Dickinson ........................ 384/530
3,820,867  6/1974  Dickinson et al. ................ 384/530

FOREIGN PATENT DOCUMENTS
925203   2/1955  Fed. Rep. of Germany .
1795507  6/1959  Fed. Rep. of Germany .
1377397  10/1974  United Kingdom .

Primary Examiner—Lenard A. Footland

[57] ABSTRACT

A separator or cage for a row of ball bearings designed to reduce friction on the balls. The pocket surfaces in the separator have recesses in the region of the axial "poles" of the balls which prevents contact between the balls and the separator pocket walls. Over the rest of the separator, the pocket walls are near enough to the balls to define a hydrodynamic lubricating film. Also over the rest of the separator pockets, the interior surfaces of the pockets are shaped to face the respective balls and to define a wedge-shaped slot with the ball for development of a hydrodynamic lubricating film as the balls rotate in either direction around their axes. The separator is comprised of two strips fastened together. Each strip has a complementary C-shaped pocket half depression, and the two strips joined together define the complete pockets that enclose the balls between the axial poles of the balls. Preferably, the separator is formed from sheet metal and the recesses in the pockets are produced by plastic deformation in the pocket walls.

9 Claims, 1 Drawing Sheet

SEPARATION FOR BALL BEARINGS

BACKGROUND OF THE INVENTION

The present invention relates to a separator or cage for ball bearings, and including pockets that receive the bearing balls. The separator is preferably comprised of sheet metal. The invention particularly concerns the shaping of the separator so as to reduce friction between the bearing balls and the separator and to improve the development of a lubricant film between the balls and the separator.

A separator of this type is known, for instance, from Federal Republic of Germany Patent No. 925,203. That separator is comprised of profiled sheet metal rings which are connected to each other. The connection is effected after the introduction of the balls. It is possible to produce pocket surfaces which surround the balls to a large extent and thus guide the balls and prevent them from falling out of the separator. One essential disadvantage of such separators, however, is that the friction is very variable, depending upon the application of the balls against given pocket surfaces. In this connection, the friction may also be very high. Furthermore, due to the absence of wedge-shaped entry surfaces for the lubricant between the balls and the pocket surfaces, no separating lubricating film can build up. These properties are unfavorable for certain uses, for instance for the mounting of phonograph spindles, since these properties can have a substantially negative effect on the absolutely necessary uniform rotation of the spindles.

SUMMARY OF THE INVENTION

It is therefore an object of the present invention to improve the separator for a ball bearing such that it does not have the above disadvantages and, in particular, such that it produces little but, at the same time, uniform friction between the balls and the separator, and for which separators of very simple construction can nevertheless be used.

Each bearing ball rotates around a respective axis that is generally parallel to the axis of the bearing and the axis of a ball passes through its "poles". The "equator" of the ball encircles it midway between its poles and across its axis.

The separator of the invention includes a plurality of circumferentially separated pockets, each of which encircles a ball from axial "pole" to "pole". In the preferred embodiment, the separator is comprised of two annular, elongate strips, particularly in ring form, which are formed of sheet metal or perhaps of other material. Each strip is provided with respective complementary C-shaped recesses, and the two strips are attached to each other so that a pair of cooperating complementary C-shaped recesses together define a pocket which encircles a respective bearing ball.

The separator pocket surfaces facing each ball have recesses, which are in the form of depressions or even holes, in the region of the bearing ball poles. The balls cannot rub or be applied against the separator pocket surfaces in the regions of the recesses. The separator pocket surfaces at the recesses are spaced sufficiently from the balls that a spin resisting lubricant film does not develop around the balls at the recesses. The low sliding speed at the poles can, therefore, not have a negative effect or cause relatively high frictional forces or cause variations in friction.

The separator guidance for a ball takes place preferably in the pocket surface region near the "equator" of each ball, where the pocket inner surfaces face the balls over the entire height of the separator in the axial direction, through a slot which narrows in wedge-shaped manner generally in a direction paralleling the axis of each ball. In this region, the relative speeds between the ball and pocket surfaces are relatively high, so that a favorable hydrodynamic lubricating film is built up here which produces uniform and low frictional forces.

From a manufacturing standpoint, in a preferred embodiment, the production of the recesses is most favorable if they comprise depressions which are produced by plastic deformation of the walls of the recesses in the sheet-metal ring at the same time as the profiling of the ring.

Federal Republic of Germany Utility Model 17 95 507 shows a single part sheet-metal separator for ball bearings, in which there also is no contact present between the balls and the separator in the region of the poles of the balls. In this prior design, however, there is merely linear application in the equator region, which does not permit the build up of a hydrodynamic lubricating slot, so that high frictional forces and wear will occur with this prior design.

Other objects and features of the invention are described with reference to the accompanying drawings.

DESCRIPTION OF THE PREFERRED EMBODIMENT

Figure 1:
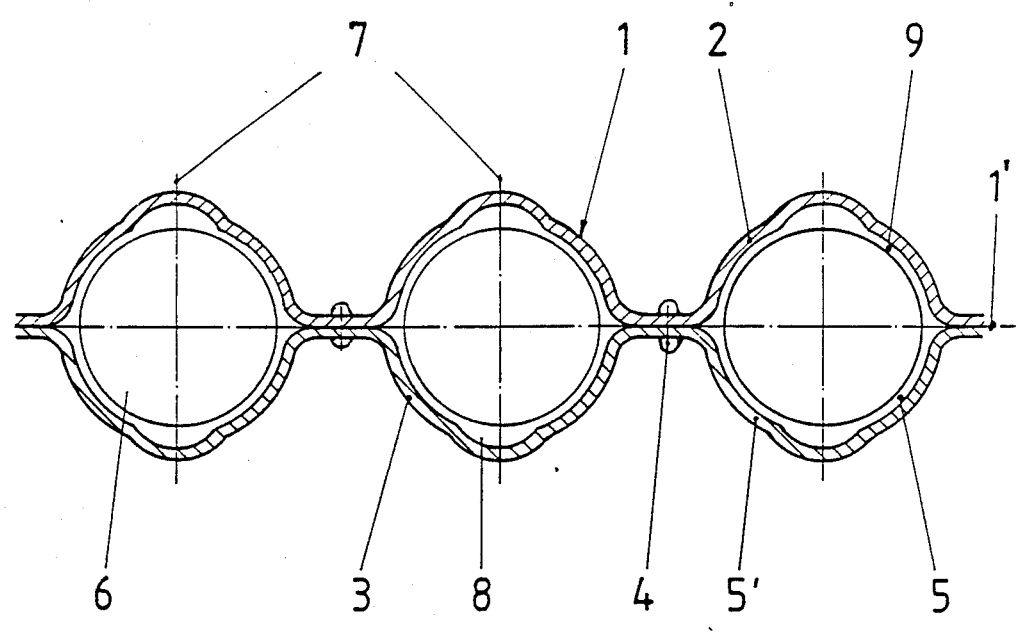
FIG. 1 shows a developed view of a portion of the separator of the invention along the section line I—I of FIG. 2.

As shown in FIG. 1, the separator 1 is comprised of two, continuous strip, annular, sheet metal separator halves 2 and 3. Each separator half is produced by deep drawing and each rests against the other along the parting line 1'. Each separator half is a strip provided with generally C-shaped depressions or half pockets at intervals along it. The separator halves are connected to each other by rivets at the places 4 beyond the edges of the pocket halves where the separator halves come together. Pockets 5 are developed between cooperating complementary C-shaped depressions or half pockets of the separator halves 2 and 3.

The bearing balls 6 are arranged in the completed pockets. The balls turn in their pockets in each case around the respective axially directed axis 7.

To cause the friction between the pocket surfaces and the balls 6 to be as low and uniform as possible, recesses 8 are provided in the bottoms of the pockets extending over the region of the ball "poles". The "poles" are at the axis of each ball and the "equator" is the large parallel between the poles. Each pocket recess 8 is in the form of a depression produced in the bottom of the respective pocket wall 5' by plastic deformation. The recesses prevent contact between the balls 6 and the pocket walls 5' near the poles, which would be unfavorable from a lubricating standpoint. This is because nearer to the poles, the rate at which the surface of the balls pass by their pocket walls is relatively slower, and a hydrodynamic lubricating film does not so readily build up.

Figure 2:
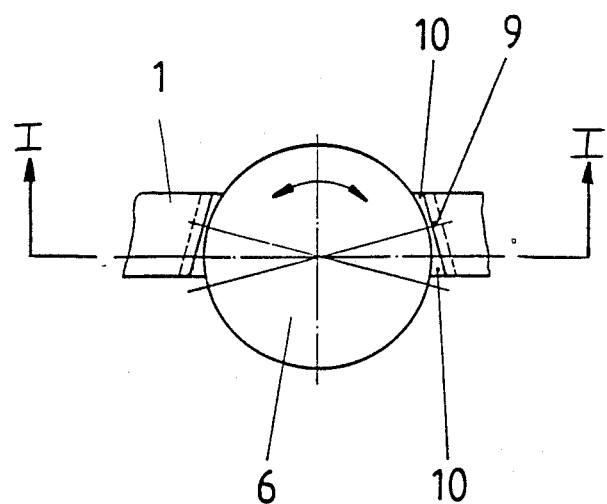
FIG. 2 shows a portion of the separator of FIG. 2 through the parting line.

As shown in FIG. 2, the interior surfaces of the pockets in the separator are flat or otherwise so shaped that sliding contact between the balls and the pocket walls away from the poles occurs at the places 9 where the relative speed between the balls 6 and the pocket walls 5' is so high that a lubricating film can hydrodynamically build up.

The lubricating conditions at the places of sliding contact are still further improved, as shown in FIG. 2, because in the remaining regions of the pocket surfaces outside the regions occupied by the recesses 8, wedge-shaped slots 10 are provided over the height of the separator in the axial direction. The slots are present for either direction of rotation of the balls around their axes. The slots 10 are produced by the pocket walls 5' being of a greater arc of curvature than the balls at these places. As illustrated, the walls at the slots 10 may be generally straight walls extending past the curved surfaces of the balls. The walls are shaped so that oppositely directed slots are formed, and there is a slot 10 no matter which direction the balls rotate around their axes. The development of a hydrodynamic lubricant film around the balls is enabled in those slots 10.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A separator for a row of ball bearings, wherein the separator has a plurality of pockets defined in it, and each pocket is for receiving a respective ball of the ball bearing; the separator having a length dimension, each pocket extending into the separator across the length dimension;

each pocket being shaped for defining a deeper recess in the pocket in the vicinity of a pole of the respective bearing ball which is supported in and rotates in the pocket, and the recess being so shaped and of such depth that the interior surface of the separator at the pocket recess is spaced a greater distance from the bearing ball in the pocket than the interior surface is spaced from the bearing ball away from the pole of the ball;

in the remaining region of the interior surface of the separator at the pocket, the interior surface being shaped so as to be spaced from the bearing ball and to define a generally wedge-shaped slot, and the interior surface being close enough to the bearing ball that in the wedge-shaped slot, a hydrodynamic lubricating film can build up.

2. The separator of claim 1, wherein the interior surface of the separator at the pocket is shaped so that a wedge-shaped slot is defined between the interior surface and the ball and the slot faces to open in both directions of rotation of each ball around an axis through its poles.

3. The separator of claim 2, wherein for forming the wedge-shaped slot, the interior surface of the pocket is generally a surface having a greater arc of curvature than the curvature of the ball.

4. The separator of claim 3, wherein the interior surface of the wedge-shaped slot comprises a generally straight wall extending past the curved surface of the ball.

5. The separator of claim 2, wherein the recesses in the separator pockets are produced by plastic deformation of the pocket walls of the separator.

6. In combination, the separator according to claim 2, and a respective bearing ball in each of the pockets, each bearing ball being of a size so as to define a hydrodynamic lubricating film at the interior surface of the respective pocket therefor when the ball rotates.

7. The separator of claim 1, wherein the separator is comprised of two complementary elongate strips, wherein each strip has a plurality of generally C-shaped half pockets defined along its length, and the two strips are so oriented and their respective half pockets are so placed and shaped and the strips are attached together so that the respective half pockets in each strip are complementary so that a respective pocket in each strip together defines the pockets in the separator for receiving the balls, and so that the pockets surround the balls from axial pole to axial pole.

8. The separator of claim 7, wherein each of the strips is comprised of sheet metal.

9. In combination, the separator according to claim 6, and a respective bearing ball in each of the pockets, each bearing ball being of a size so as to define a hydrodynamic lubricating film at the interior surface of the respective pocket therefor when the ball rotates.

* * * * *